United States Patent [19]

Soulliard

[11] 4,369,338
[45] Jan. 18, 1983

[54] SUB-MINIATURE TONE DECODER

[75] Inventor: Charles Soulliard, Tucson, Ariz.

[73] Assignee: Midian Electronics, Inc., Tucson, Ariz.

[21] Appl. No.: 189,207

[22] Filed: Sep. 22, 1980

[51] Int. Cl.³ ............................................. H04M 1/50
[52] U.S. Cl. ................................. 179/84 VF; 328/75; 455/38
[58] Field of Search ..................... 179/84 R, 84 VF; 328/138, 167, 119, 75; 340/171 R; 455/35, 36, 37, 38, 218, 227

[56] References Cited

U.S. PATENT DOCUMENTS 3,670,242  6/1972  McGarvey ........................... 455/36
3,780,230 12/1973  Bowen et al. .................. 179/84 VF
4,151,472  4/1979  Watanabe et al. ......... 179/84 VF X Primary Examiner—Joseph A. Popek
Attorney, Agent, or Firm—Harold Gell

[57] ABSTRACT

A tone decoder for the sixteen standard Bell System DTMF tone pairs is presented which is comprised of first and second tone detectors adapted to provide logic signals in response to detection of predetermined frequencies. The logic signals are processed by a counter which is incremented by simultaneous logic signals from the first and second tone detectors and which controls a switch adapted to change the frequencies to which the tone detectors are responsive.

10 Claims, 1 Drawing Figure

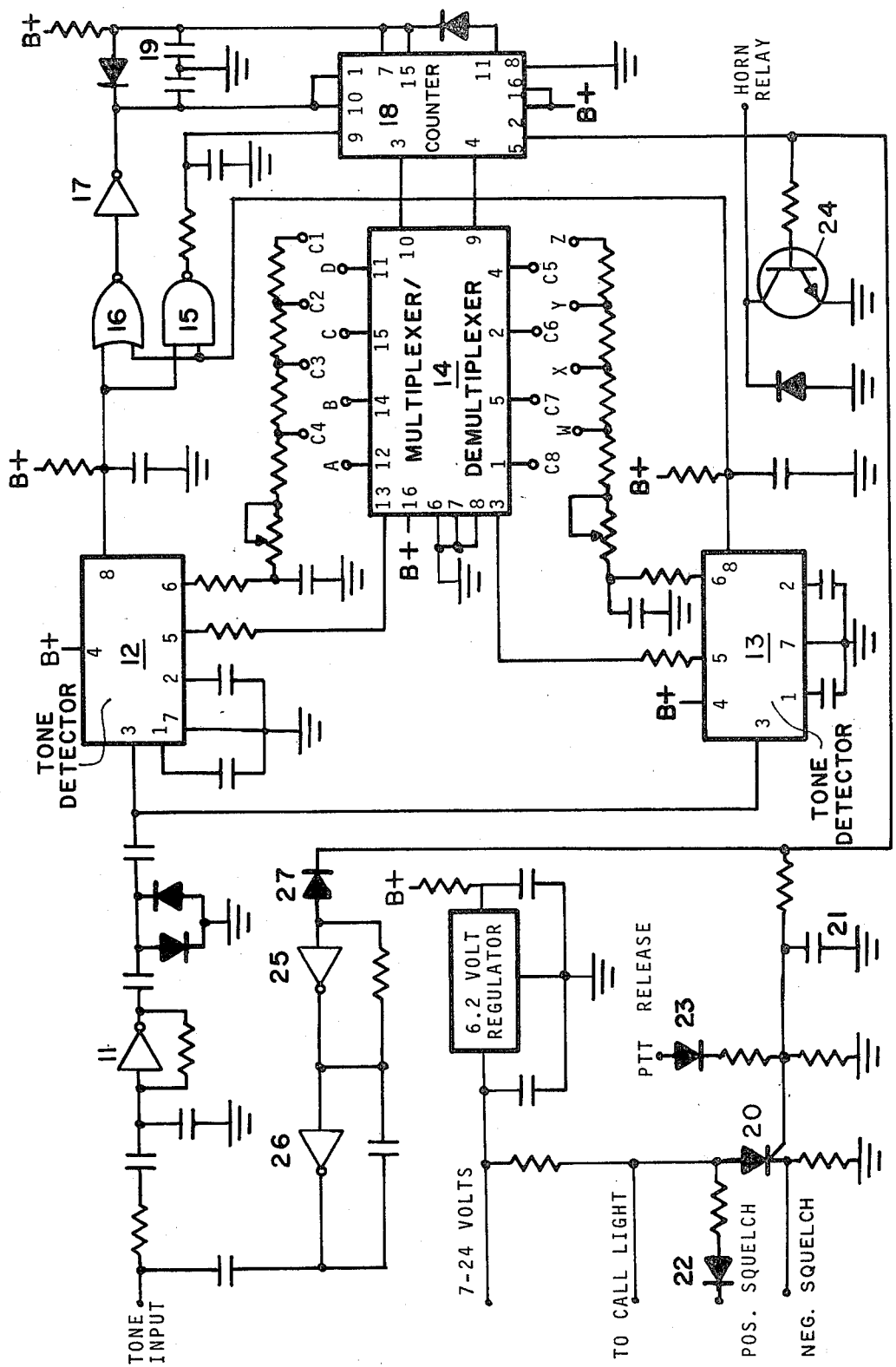

SUB-MINIATURE TONE DECODER

TECHNICAL FIELD

This invention relates to a decoder for the sixteen standard Bell System DTMF tone pairs.

BACKGROUND OF PRIOR ART

The use of multitone telephone dialing has become increasingly popular and has resulted in numerous means to decode dual tones. These known systems are generally complex and relatively large with respect to state of the art radio telephone systems.

OBJECTIVES OF THE INVENTION

Therefore, it is a primary objective of the present invention to provide a sub-miniature tone decoder which will decode the sixteen standard Bell System DTMF tone pairs.

A further objective of the present invention is to provide a decoder which will decode any four digit number comprised of tone pairs.

A still further objective of the present invention is to provide a sub-miniature dual tone decoder which has low power consumption and small size so that it may be incorporated in hand-held radio telephone sets.

A still further objective of the present invention is to provide a DTMF tone decoder which utilizes phase lock loops for decoder frequency stability.

A further objective of the present invention is to provide a DTMF tone decoder which includes an error detection means that will recognize wrong numbers which might occur in the same column and row as a desired correct number.

The preceding, and other objectives of the present invention will become apparent in light of the specification, drawings and claims which follow.

BRIEF SUMMARY OF THE INVENTION

The sub-miniature tone decoder decodes number codes comprised of any of the sixteen standard Bell System DTMF tone pairs by applying received tones to two digitally tuned phase-locked loop tone detectors. Each detector is capable of detecting up to four tones in a sequence controlled by a counter which is incremented when both tone detectors indicate the presence of a proper tone by providing a logic level output. The four tone response frequencies for each tone detector are functions of RC networks that are selectively changed in response to each step of the counter.

The sub-miniature tone decoder includes a means whereby an associated receiver is muted until a proper four number sequence has been decoded. Once a proper sequence has been decoded, an alert warning is provided to the operator and the receiver muting function is disabled.

BRIEF DESCRIPTION OF THE DRAWINGS

The single FIGURE is a schematic diagram of the sub-miniature tone decoder of the present invention.

DETAILED DESCRIPTION OF THE INVENTION

The tone input of FIG. 1 is connected to the audio channel of an associated receiver upstream from a muting control point. Received tones are processed through an active filter comprised of an RC network and amplifier 11. The filtered input tones are then applied in parallel to tone detectors 12 and 13 which, in a preferred embodiment, are low power phase-locked loop circuits whose frequency response is controlled by an RC network external to the integrated circuit. In a preferred embodiment, the decoders are type XR-L567 micropower tone decoders as supplied by Exar Integrated Systems, Inc. which include a quadrature phase detector in combination with the phase-locked loop.

Pins 5 and 6 of tone detectors 12 and 13 are coupled to timing RC circuits by a dual four channel analog multiplexer/demultiplexer such as a Motorola MC14052B. This integrated circuit includes a single input for each channel on pins 9 and 10 and in response to sequential digital inputs on pins 9 and 10 it sequentially connects the output of each channel to each of the four inputs in the manner of a single-pole four-throw switch.

In the FIGURE, the control input to the upper channel is the simultaneous input on pins 9 and 10 and the output pin 13 with the four selective inputs being applied on pins 11, 12, 14 and 15. In operation, the four inputs on pins 11, 12, 14 and 15 are electrically connected to contacts C1 through C4 of the resistive network of the timing RC circuit for tone detector 12. These interconnections vary for each sub-miniature tone decoder and provide the means whereby the specific tone sequence to which detector 12 is responsive to is programmed.

The lower channel of the analog multiplexer/demultiplexer 14 is controlled by the simultaneous input on pins 9 and 10 with the output derived from pin 3 and the four sequentially selected inputs from pins 1, 2, 4 and 5. As in the upper channel, the lower channel selective inputs provide programming of tone detector 13 through the selective electrical connection to contacts C5, C6, C7 and C8.

The outputs of tone detectors 12 and 13 are provided at pin 8 of each integrated circuit and are normally in a "high" state. When a tone for which a detector is tuned is detected, the output goes low or to a logic 0.

The outputs of detectors 12 and 13 are applied to the two input NAND gate 15 and two input NOR gate 16.

The output of NOR gate 16 is normally low until both tone detectors 12 and 13 go low in response to each detector receiving a frequency for which it is tuned. When this occurs, both inputs to NOR gate 16 are low or a logic 0 and its output is high or a logic 1. The logic 1 or high output of NOR gate 16 is inverted by inverter 17 and applied to pins 1 and 10 of counter 18. In a preferred embodiment, counter 18 is a Motorola type MC14518B. This counter is a dual up counter and one channel is incremented in response to each logic 0 or low pulse applied to pin 1. As counter 18 is stepped in channel 1 via inputs to pin 1, the outputs at pins 3 and 4 cause the upper and lower channels of multiplexer 14 to step via inputs 9 and 10 and thereby change the frequency response of detectors 12 and 13.

The second channel of counter 18 is incremented by a logic 1 or high output of NAND gate 15 while the output of 17 is high. Thus if the output of either tone detector 12 or 13, but not both, is low, the outputs of NAND gate 15 and inverter 17 will be high and the second channel of the counter will be incremented. If either or both tone detectors 12 and 13 detect a proper tone and then both provide a high input indicative of no tone detection, the output of NAND gate 15 will go low in response to the simultaneous high outputs from both detectors and the second channel of counter 18 will not be incremented. However, with pin 9 of 18 low, an increment or step of the second channel of counter 18 will occur in response to the high to low transition of pin 10 of the counter as caused by the next simultaneous tone detection by detectors 12 and 13. This causes the first output of the second channel of counter 18 at pin 11 to go high and this resets the first channel via pin 7 and the second channel via pin 15.

With any input of NOR gate 16 high, the output of inverter 17 will be high. This makes pin 10 of counter 18 high. This condition will exist as long as both "correct" tones are missing or only one "correct" tone is present at detectors 12 and 13.

With both inputs of NAND gate 15 high, pin 9 of counter 18 will be low.

When both inputs of NAND gate 15 and NOR gate 16 go low, the output of inverter 17 goes low and stays low for duration of the two tones. When the tones disappear the output of inverter 17 rises, incrementing 18 one increment, thus advancing multiplexer 14.

When both inputs of NAND gate 15 and NOR gate 16 go low, the output of NAND gate 15 goes high but the second half of counter 18 does not increment because inverter 17 is low. However when one input of NAND gate 15 drops, the output of NAND gate 15 rises while the output of inverter 17 remains high. This advances the second half of counter 18 causing it to reset both halves of counter 18.

Error detection and reset occurs only when one correct tone is present and the other is missing.

The RC integrater following NAND gate 15 delays the output of NAND gate 15 to pin 9 of counter 18 in case one detection is slow to lock.

The sequence of operation of the decoder is as follows. With both detectors 12 and 13 non-responsive to inputs, the outputs of the detectors is high or at a logic level 1. This places a logic 0 at pin 9 of counter 18 and a logic 1 or high at pins 1 and 10. If either detector 12 or 13 senses a proper tone but the other detector fails to sense a proper tone simultaneously, inputs 1 and 10 of counter 18 will remain high and pin 9 will transition from a low to a high. This causes the second channel of counter 18 to increment and a reset pulse is provided at pin 11 to reset both the first and second channels of the counter.

Assuming both detectors 12 and 13 simultaneously detect a proper tone, pins 1 and 10 of counter 18 will go low and pin 9 will go high. No action in the counter occurs at this time, but when the dual received tones, or at least one of the dual received tones passes and the output of one of the tone detectors switches from a low to a high, pins 1 and 10 of counter 18 transition from a low to a high and increment the first channel of counter 18. This causes pin 3 of counter 18 to go high while pins 4 and 5 remain low. The high at pin 3 of counter 18 causes a logic level to be applied to control pin 10 of multiplexer 14 and this steps both the upper and lower channel from the quiescent condition wherein pin 13 is connected to pin 12 and pin 3 is connected to pin 1 to a second condition wherein pin 13 is connected to pin 14 and pin 3 is connected to pin 5.

The status of counter 18 is now, pin 9 low and pins 1 and 10 high. If an improper code is now received, pin 9 will go high while pins 1 and 10 of counter 18 remain low. This causes no change in either channel of counter 18. But, if after this occurs, both detectors 12 and 13 simultaneously detect a proper tone, the transition at pin 10 from a high to a low will cause pin 11 to go high and produce a reset pulse for both channels of counter 18. Also, both channels of counter 18 may be reset by a high at pins 7 and 15 as produced when capacitor 19 becomes fully charged as a function of pins 1 and 10 of counter 18 remaining in the high or logic 1 status an excessive duration of time.

If however, the first coincident tone detection by detectors 12 and 13 is followed by a second coincident detection, pin 9 of counter 18 remains high and pins 1 and 9 go low to discharge timing capacitor 19 and ready the first channel of counter 18 so that it will increment when the tones pass and pin 1 transitions from low to high as previously discussed. This second increment of channel 1 of counter 18 causes the output at pin 3 to go low and pin 4 to go high placing a logic level 0 at pin 10 of multiplexer 14 and a logic level 1 at pin 9. This increments the upper and lower channels of the multiplexer so that pin 13 is connected to pin 15 and pin 3 is connected to pin 2.

If a third simultaneous detection occurs by detectors 12 and 13 before capacitor 19 times out and without an intervening single detection by either detector 12 or 13, channel 1 of counter 18 will be incremented again and the output at pin 3 will go high while 4 remains high. This places a logic 1 at both pins 9 and 10 of multiplexer 14. This causes pin 13 of the multiplexer to be connected to pin 11 and pin 3 to be connected to pin 4.

If a fourth simultaneous tone detection occurs by detectors 12 and 13 in a timely fashion, channel 1 of counter 18 will again be incremented. This will cause the outputs at pins 3 and 4 to go low to create a logic 0 at both pins 9 and 10 of multiplexer 14 to place both detectors 12 and 13 in condition to receive the first digit of a four digit code by connecting pin 13 to pin 12 and pin 3 to pin 1. This sequence of the first channel of counter 18 also causes pin 5 of counter 18 to go high.

A high at pin 5 of counter 18 gates on SCR 20 which removes the receiver squelch either via the negative squelch connection 21 or by back biasing diode 22 and removing the positive squelch. Gating on of SCR 20 also energizes the call light to provide an indication that a proper four digit signal has been decoded. A PTT switch connection is provided to the gate of SCR 20 via diode 23 to permit an operator to remove the squelch from the receiver in the event an operator wishes to monitor what is being received prior to initiating a call or for some other purpose.

The logic level 1 or high voltage level at pin 5 of counter 18 also activates the horn relay via transistor 24 to provide an audible indication of a proper tone decoding sequence. The high logic level at pin 5 of counter 18 has a still further affect in that it triggers the alert tone oscillator comprised of amplifiers 25 and 26 and related RC components by back biasing diode 27. This causes an alert tone to be generated and applied to the audio circuit for approximately 2 seconds as controlled by the discharge of capacitor 19 which causes counter 18 to be reset in both channels. Resetting the counter removes the logic 1 from pin 5 of the counter which disables the alert tone and the horn relay. However, the receiver is not squelched because once gated, SCR 20 remains on until recycled by turning the decoder off and then on again.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A tone decoder, comprising:
   a first tone detector for providing a logic signal in response to detection of a predetermined frequency;
   a second tone detector for providing a logic signal in response to detection of a second predetermined frequency;
   counting means for counting simultaneous logic signals from said first and second tone detectors; and
   switching means responsive to a predetermined count in said counting means for changing the frequency to which said first and second tone detectors are responsive.

2. A tone decoder as defined in claim 1 wherein said first and second tone detectors include a frequency detection determining means comprised of an RC circuit whose resistance value is incrementally changed by said switching means.

3. A tone decoder as defined in claim 2 wherein said first and second tone detectors include phase-locked loops.

4. A tone decoder as defined in claim 1, further comprising:
   means for resetting said counting means in response to simultaneous different level logic signals from said first and second tone detectors.

5. A tone decoder as defined in claim 4 wherein said counting means is incremented in response to simultaneous equal logic level signals from said first and second detectors.

6. A tone decoder as defined in claim 1, further comprising timing means for resetting said counting means when simultaneous, like logic level signals are not received from said first and second tone detectors for a predetermined period of time.

7. A tone decoder as defined in claim 1 for use in conjunction with a radio receiver of the type incorporating a muting means, further comprising:
   means to couple audio frequency signals from the radio receiver to said first and second tone detectors.

8. A tone decoder as defined in claim 7, further comprising:
   means for disabling said receiver muting means in response to a predetermined output of said counting means.

9. A tone decoder as defined in claim 8, further comprising:
   means for manually disabling said muting means.

10. A tone decoder as defined in claim 9, further comprising:
    signal means for providing an audible alert in response to said counting means achieving a predetermined number of counting increments.

* * * * *